3,116,292
Patented Dec. 31, 1963

3,116,292
THIO-DERIVATIVES OF BENZO-OXAZINE, HAVING ANTIPHLOGISTIC, ANTI-PYRETIC AND ANALGESIC PROPERTIES
Luigi Polo Friz, Milan, Italy, assignor to Laboratorio Bioterapico Milanese Selvi & C. S.A.S., Milan, Italy, a company of Italy
No Drawing. Filed Oct. 16, 1962, Ser. No. 231,001
2 Claims. (Cl. 260—244)

This invention relates to novel chemical compounds possessing activity as anti-inflammatory, anti-pyretic and analgesic agents.

One of these compounds, in the preliminary pharmacological tests, has shown an interesting uricosuric activity. The general formulas of these compounds are:

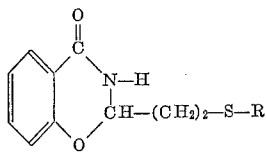

(I)

and

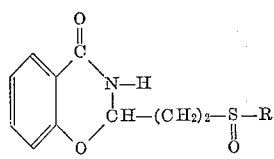

(II)

where R is an alkyl, aralkyl or aryl radical.

In rats and rabbits, 2-beta-methylthioethyl-4-oxo-2,3-dihydro-(benzo-1,3-oxazine) (Formula I, R=methyl) and 2 - beta - phenylsulphoxyethyl-4-oxo-2,3-dihydro-(benzo-1,3-oxazine) (Formula II, R=phenyl) are more active than salicylamide or salicyclic acid, administered by the same route. Also the anti-phlogistic activity, investigated in rats, using the cotton pellet granuloma test, the analgesic (tested by electrical stimulation of animal dental pulp) and the antiexudative and anti-permeabilizing properties (tested on albumen-induced edema), appear to be much better than that of salicylamide and chlorothenoxazine.

The same compounds have also proved to possess a very high degree of tolerability; when orally administered to rats, the $DL_{50}$ was found, for example, to be greater than 2 g./kg.

The best methods known to me for the preparation of these compounds are:
(1) Condensation of salicylamide with a thioaldehyde acetal of formula:

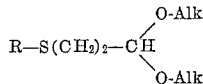

and subsequent oxidation, to obtain the sulphoxides with stoichiometric amounts of hydrogen peroxide, peracetic acid, perbenzoic acid or perphthalic acid etc.
(2) Condensation of salicylamide with an alogen aldehyde acetal of formula:

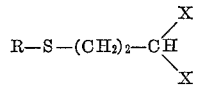

where X is an alogen, and subsequent reaction of the 2-alogeno ethyl-benzo-oxazine thus obtained with alkyl, aralkyl or aryl mercaptanes.

The thio-derivatives are oxidized as indicated in (1), above.

The following examples are illustrative of the products of the present invention without, however, limiting the same.

EXAMPLE 1

2-(Beta-Methylthioethyl)-4-Oxo-2,3 Dihydro(Benzo-1,3-Oxazine)

8.5 grs. of beta-methylthio-propionaldehyde di-ethylacetal and 6.8 grs. salicylamide are suspended in 75 ml. of chloroform. 6 ml. of acetic acid are added and the mixture is heated to 50° C. Dry hydrogen chloride is sparged for 75 mins., while keeping the temperature at 50° C. At the end of the reaction, the reaction mixture is allowed to cool and the solvent is evaporated. A pasty residue is obtained, which is dissolved in 100 ml. of tiethylether and twice treated with a 20 ml. portion of 10% NaOH, in order to eliminate any unreacted salicylamide. The ethereal solution is twice washed with water until neutral, whereafter it is dried on $K_2CO_3$. The solvent is evaporated and the solid residue is crystallized from 95% ethanol to obtain 7–9 grs. of white crystalline product having a M.P. 48.5° C.

Analysis for $C_{11}H_{13}NO_2S$:
    Percent found: C=58.93; H=5.93; N=6.16; O=14.48; S=14.05
    Percent calcd.: C=59.17; H=5.87; N=6.27; O=14.33; S=14.36

EXAMPLE 2

2-(Beta-Propylthio-Ethyl)-4-Oxo-2,3 Dihydro-(Benzo-1,3-Oxazine)

9.8 grs. of beta-propylthio-propionaldehyde diethylacetal and 6.8 grs. of salicylamide are suspended in 75 ml. of chloroform. 6 ml. of glacial acetic acid are added and the mixture is heated to 50° C.

Dry hydrogen chloride is sparged for 90 mins., while keeping the temperature at 50° C. Then the reaction mixture is cooled and the solvent evaporated. The remainder of the procedure is very much the same as Example 1.

A dense, viscous liquid is obtained, having a B.P. of 170–175° C. at 0.3 mm. Hg which tends to crystallize in a frigorific mixture.

Analysis for $C_{13}H_{17}NO_2S$:
    Percent found: N=5.28; S=12.31
    Percent calcd.: N=5.57; S=12.75

EXAMPLE 3

2-(Beta-Benzylthio-Ethyl)-4-Oxo-2,3-Dihydro (Benzo-1,3-Oxazine)

14.5 grs. of beta-benzyl-thio-propionaldehyde, diethylacetal are condensed with 6.8 grs. of salicylamide in chloroform in the presence of 6 ml. acetic acid, bubbling dry HCl gas as described in Example 1. A crude product is obtained, having a M.P. of 50–55° C., which is purified through numerous crystallizations from aqueous methanol; a light straw-coloured product in needle-shaped crystals: M.P. 63.5° C.–64.5° C., is thus collected.

Analysis for $C_{17}H_{17}NO_2S$:
    Percent found: C=68.33; H=5.79; N=4.80; O=10.79; S=10.55
    Percent calcd.: C=68.20; H=5.72; N=4.68; O=10.69; S=10.71

EXAMPLE 4

2-(Beta-Phenylthioethyl)-4-Oxo-2,3-Dihydro (Benzo-1,3-Oxazine)

11.5 grs. of beta-phenylthio-propionaldehyde diethylacetal, 6.8 grs. of salicylamide and 6 ml. of glacial acetic acid are placed in 75 ml. chloroform. The reaction mixture is heated to 50° C. and dry hydrogen chloride is sparged therethrough for 75 mins. At the end of the reaction, the procedure described in Example 1 is followed step by step to obtain 15 grs. of crude product which gives a crystalline solid having a M.P. of 127° C. when crystallized from 95% ethanol.

EXAMPLE 5

*2-(Beta-Methylsulphoxy-Ethyl)-4-Oxo-2,3-Dihydro (Benzo-1,3-Oxazine)*

2.5 grs. of 2-(beta-methylthio-ethyl)-4-oxo-2,3-dihydro (benzo-1,3-oxazine) are dissolved in the cold, in 20 ml. of 95% ethanol. 2.6 ml. of 30% aqueous hydrogen peroxide are added and the mixture is allowed to stand at room temperature for 5 days. Dilution with water gives rise to the precipitation of 2.2 grs. of crude product, M.P. 90–95° C. Repeated crystallization from aqeuous ethanol gives a pure product, M.P. 98–100° C.

*Analysis for* $C_{11}H_{13}NO_3S$:
  Percent found: C=55.70; H=5.35; N=5.65; O=20.41; S=13.35
  Percent calcd.: C=55.22; H=5.48; N=5.85; O=20.06; S=13.40

EXAMPLE 6

*2-(Beta-Phenylsulphoxyethyl)-4-Oxo-2,3-Dihydro (Benzo-1,3-Oxazine)*

20 grs. of 2(beta-phenylthio-ethyl)-4-oxo-2,3 dihydro (benzo-1,3 oxazine) are dissolved in 160 ml. of hot ethanol. 16 ml. of 29.6% aqueous hydrogen peroxide are added, and the mixture is boiled for 2 hours on a water bath. After one night's stay in a refrigerator, a precipitate is collected on a suction filter and gives 15 grs. of crude product, M.P. 164–166° C. By crystallizing from 150 ml. of absolute ethanol the pure sulphoxide, M.P. 169–170° C., is obtained.

*Analysis for* $C_{16}H_{15}NSO_3$:
  Percent found: C=63.24; H=4.88; N=4.80; O=15.96; S=10.68
  Percent calcd.: C=63.75; H=5.02; N=4.60; O=15.92; S=10.64

EXAMPLE 7

*2-(Beta-Phenylthioethyl)-4-Oxo-2,3-Dihydro (Benzo-1,3-Oxazine)*

3.82 grs. of potassium hydroxide are dissolved in 1200 ml. of ethanol, 51.4 grs. of thiophenol and 98.75 grs. of 2 - beta - chloro - ethyl-4-oxo-2,3-dihydro (benzo-1,3-oxazine) are added and the mixture is heated under reflux for five hours. The solvent is removed under reduced pressure and the residue is recrystallized from ethanol (95%), to obtain 40 grs. of a white crystalline product having a M.P. of 126–127° C.

*Analysis for* $C_{16}H_{15}NO_2S$:
  Percent found: C=67.04; H=5.60; O=11.51; S=11.00
  Percent calcd.: C=67.33; H=5.30; O=11.21; S=11.23

What I claim is:

1. 2 - beta - methylthioethyl-4-oxo-2,3-dihydro (benzo-1,3-oxazine):

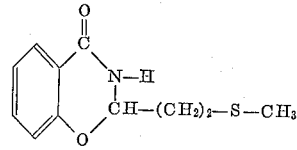

2. 2-beta-phenylsulfoxyethyl-4-oxo-2,3-dihydro (benzo-1,3-oxazine):

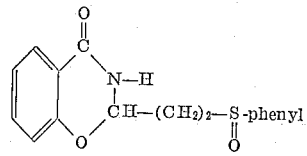

No references cited.